US006543137B1

(12) United States Patent
Noller et al.

(10) Patent No.: US 6,543,137 B1
(45) Date of Patent: Apr. 8, 2003

(54) METHOD FOR MOUNTING A VALVE MODULE OF A FUEL INJECTOR

(75) Inventors: Klaus Noller, Oppenweiler (DE); Hans Weidler, Pettstadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/623,733

(22) PCT Filed: Sep. 25, 1999

(86) PCT No.: PCT/DE99/03097

§ 371 (c)(1), (2), (4) Date: Nov. 21, 2000

(87) PCT Pub. No.: WO00/40858

PCT Pub. Date: Jul. 13, 2000

(30) Foreign Application Priority Data

Jan. 8, 1999 (DE) ........................................ 199 00 405

(51) Int. Cl.$^{7}$ .......................... B21D 51/16; B23P 11/02

(52) U.S. Cl. .................. 29/890.124; 29/446; 29/522.1; 239/585.4

(58) Field of Search ..................... 29/890.124, 890.122, 29/890.125, 890.126, 890.13, 506, 507, 522.1, 523, 451, 446, 448, 449, 450; 239/585.4, 585.1, 585.2, 585.3; 251/129.16, 129.21

(56) References Cited

U.S. PATENT DOCUMENTS

| | | | | | |
|---|---|---|---|---|---|
| 3,570,093 | A | * | 3/1971 | Gollwitzer | 29/446 |
| 3,949,535 | A | * | 4/1976 | King | 52/758 D |
| 4,471,643 | A | * | 9/1984 | Champoux et al. | 72/391 |
| 4,946,107 | A | | 8/1990 | Hunt | |
| 5,915,626 | A | * | 6/1999 | Awarzamani et al. | 239/585.4 |
| 6,039,271 | A | * | 3/2000 | Reiter | 239/585.4 |
| 6,257,509 | B1 | * | 7/2001 | Hafner et al. | 239/585.4 |
| 2001/0002681 | A1 | * | 6/2001 | Willke et al. | 239/585.4 |

FOREIGN PATENT DOCUMENTS

| | | | | | |
|---|---|---|---|---|---|
| DE | 43 10 819 | | | 10/1994 | |
| DE | 195 47 406 | | | 6/1997 | |
| DE | 198 27 136 | A1 | * | 12/1999 | 239/585.4 |

* cited by examiner

*Primary Examiner*—Gregory M. Vidovich
*Assistant Examiner*—Marc Jimenez
(74) *Attorney, Agent, or Firm*—Kenyon & Kenyon

(57) ABSTRACT

A method of assembling a valve module of a fuel injector for fuel injection systems of internal combustion engines is described. The fuel injector includes an electromagnetic actuating element having a magnet coil, an internal pole, an external magnetic circuit part and a movable valve closing body which works together with a valve seat assigned to a valve seating body. The valve seating body and the internal pole are arranged in an internal opening in a thin-walled valve sleeve, and the magnet coil and the external magnetic circuit part are arranged on the outer periphery of the valve sleeve. First, the magnetic circuit part is pushed onto the valve sleeve, then the valve seating body is pressed into the internal opening in the valve sleeve, so that a fixed connection between the valve sleeve and the magnetic circuit part is achieved by simply pressing the valve seating body into position.

6 Claims, 2 Drawing Sheets

METHOD FOR MOUNTING A VALVE MODULE OF A FUEL INJECTOR

FIELD OF THE INVENTION

The present invention relates to a method of assembling a valve module of a fuel injector.

BACKGROUND INFORMATION

U.S. Pat. No. 4,946,107 has already described an electromagnetically operable fuel injector having, inter alia, a nonmagnetic sleeve as the connecting part between a core and a valve valve seating body. The sleeve runs over its entire axial length with a constant outside diameter and a constant inside diameter and accordingly has equally large inlet openings at both ends. The core and the valve seating body are designed with an outside diameter such that they extend into the sleeve at both ends so that the sleeve completely surrounds both parts, the core and the valve seating body, in areas projecting into them. A valve needle with an armature that is guided through the sleeve moves inside the sleeve. The fixed connections of the sleeve to the core and the valve seating body are achieved by welding, for example, as is also described in German Published Patent Application No. 43 10 819, where a thin-walled nonmagnetic sleeve is used as the connecting part between the core and the valve seating body of a fuel injector. In terms of the design, this sleeve largely corresponds to the sleeve described in U.S. Pat. No. 4,946,107. The volume and the weight of the fuel injector can be reduced with the help of the tubular sleeves.

Published German Patent Application No. 195 47 406 also describes a fuel injector having an elongated, thin-walled, nonmagnetic sleeve which also has a bottom section in addition to its jacket section. The bottom section runs largely perpendicular to the otherwise axial extent of the sleeve along the longitudinal axis of the valve. A valve needle can move axially in a through-hole in the sleeve. A valve closing body fixedly connected to the valve needle works together with a valve seat face provided on a valve seating body, with the valve seating body pressed in the sleeve in direct or indirect contact with a bottom section of the sleeve by means of a perforated disk. To produce the finished valve, the sleeve is surrounded at least partially by an injection molded plastic sheathing.

SUMMARY OF THE INVENTION

The method according to the present invention for assembling a valve module of a fuel injector has the advantage that it can be carried out easily and inexpensively and therefore a reliable and secure assembly of the fuel injector is guaranteed. An external magnetic circuit part which conducts the magnetic flux can be attached very easily in the valve without using an additional joining method, so that bonding methods of joining need not be used in an advantageous manner. This eliminates all the disadvantages of methods that must be performed with heat, such as welding warpage. Assembly of the valve is also simplified inasmuch as no tools are needed for mounting the magnetic circuit part.

DETAILED DESCRIPTION

Figure 1:
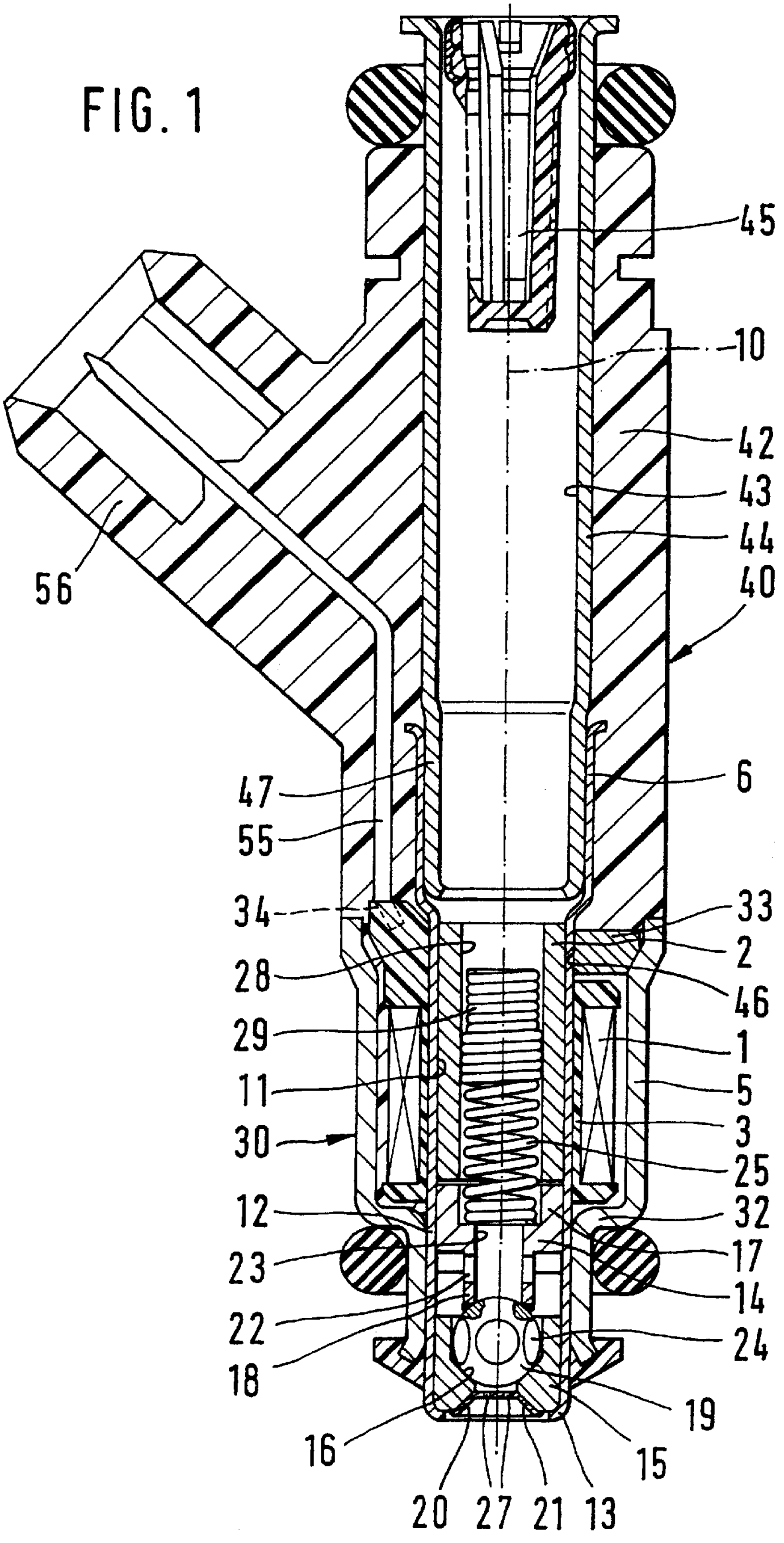
FIG. 1 shows a fuel injector having a valve module installed according to the present invention.

The electromagnetically operable valve installed according to the present invention, illustrated in FIG. 1 as an example, in the form of an injection valve for fuel injection systems of internal combustion engines having applied ignition of a compressed mixture has an essentially tubular core 2 surrounded by a magnet coil 1 which functions as the internal pole and in part as a fuel flow passage. Magnet coil 1 is completely surrounded in the peripheral direction by an outer sleeve-shaped valve jacket 5 which is designed with steps and may be ferromagnetic, for example; this magnet coil functions as an external magnetic circuit part which serves as an external pole. Magnet coil 1, core 2 and valve jacket 5 together form an actuating element that can be energized electrically.

While magnet coil 1 embedded in a coil body 3 surrounds a valve sleeve 6 on the outside, core 2 is inserted into an internal opening 11 in valve sleeve 6 running concentrically with a longitudinal axis 10 of the valve. Valve sleeve 6 may be ferritic, for example, and has an elongated design with thin walls, a jacket section 12 and a bottom section 13, jacket section 12 bordering opening 11 in the peripheral direction and bottom section 13 bordering this opening in the axial direction at its downstream end. Opening 11 also functions as a guide opening for a valve needle 14 which is axially movable along longitudinal axis 10 of the valve.

In addition to core 2 and valve needle 14, a valve seating body 15 is also arranged in opening 11 and sits on bottom section 13 of valve sleeve 6 and has a fixed valve seat face 16 as the valve seat. Valve needle 14 is formed, for example, by a tubular armature section 17, a needle section 18 which is also tubular and a spherical valve closing body 19, with valve closing body 19 being fixedly connected to needle section 18 by a weld, for example. A flat spray perforated disk 21 is arranged on the downstream end of valve seating body 15, e.g., in a recess 20 in the form of a truncated cone, with the fixed connection between valve seating body 15 and spray perforated disk 21 being formed by a tight peripheral weld, for example. One or more transverse openings 22 are provided in needle section 18 of valve needle 14. so that fuel flowing through armature section 17 in an internal longitudinal bore 23 can escape to the outside and can flow along valve closing body 19, e.g., on flat surfaces 24, toward valve seat face 16.

This fuel injector is operated electromagnetically in a known way. The electromagnetic circuit having magnet coil 1, internal core 2, outer valve jacket 5 and armature section 17 functions to provide the axial movement of valve needle 14 and thus to open the injection valve against the spring force of a restoring spring 25 acting on valve needle 14 and to close the injection valve. Armature section 17 is aligned with core 2 with the end facing away from valve closing body 19.

Spherical valve closing body 19 acts together with valve seat face 16 of valve seating body 15 tapering in the form of a truncated cone in the direction of flow; valve seat face 16 is designed downstream from a guide opening in valve seating body 15 in the axial direction. Spray perforated disk 21 has at least one, e.g., four, spray openings 27 formed by erosion, laser cutting or punching.

The depth of penetration of core 2 in the injection valve also determines the stroke of valve needle 14. An end position of valve needle 14 when magnet coil 1 is not energized is determined by the contact of valve closing body 19 with valve seat face 16 of valve seating body 15, while the other end position of valve needle 14 when magnet coil 1 is energized is determined by the contact of armature section 17 with the downstream core end. The stroke is adjusted by an axial displacement of core 2, which is fixedly connected to valve sleeve 6 according to the desired position below and is produced, for example, by a cutting method such as turning.

In addition to restoring spring 25, an adjusting element in the form of an adjusting spring 29 is also inserted into a flow hole 28 of core 2 running concentric to longitudinal axis 10 of the valve and serving to supply fuel in the direction of valve seat face 16. Adjusting spring 29 is provided to adjust the spring bias of restoring spring 25, which is in contact with adjusting spring 29 and, in turn, is supported at its opposite end on valve needle 14, with the dynamic spray volume also being adjusted with adjusting spring 29. Instead of an adjusting spring, the adjusting element may also be designed as an adjusting screw, an adjusting sleeve or the like.

The injection valve described so far is characterized by an especially compact design, forming a very small, convenient injection valve. These parts form an independent, preassembled module which is labeled as function part 30 below. Function part 30 therefore includes electromagnetic circuit 1, 2, 5 and a sealing valve (valve closing body 19, valve seating body 15) with a downstream jet processing element (spray perforated disk 21).

The coil space formed between valve jacket 5 and valve sleeve 6 is almost completely filled by magnet coil 1 and is bordered in the direction facing valve seating body 15 by a stepped radial area 32 of valve jacket 5, while the closure on the side facing away from valve seating body 15 is guaranteed by a disk-shaped cover element 33. Coil body 3 passes through a recess in cover element 33. Two contact pins 34, for example, made of the same plastic as coil body 3 project in this area. The electric contacting of magnet coil 1 and thus its energization take place through electric contact pins 34.

Completely independently of function part 30, a second module is produced, referred to below as connecting part 40. Connecting part 40 is characterized mainly by the fact that it includes the electric and hydraulic connection of the fuel injector. Connecting part 40, which is designed mostly as a plastic part, therefore has a tubular base body 42 to serve as the fuel inlet connection. A fuel filter 45, for example, is inserted or pressed into a flow hole 43 in an inside tube 44 in base body 42 running concentrically to longitudinal axis 10 of the valve, fuel flowing axially through flow hole 43 from the inlet end of the fuel injector.

When the fuel injector is completely assembled, a hydraulic connection of connecting part 40 and function part 30 is achieved by aligning flow holes 43 and 28 of the two modules so that unhindered flow of fuel is guaranteed. An internal opening 46 in cover element 33 makes it possible to design valve sleeve 6 and thus also core 2 so that both pass through opening 46, and at least valve sleeve 6 definitely extends beyond cover element 33 in the direction of connecting part 40. In the assembly of connecting part 40 on function part 30, a lower end 47 of tube 44 in the projecting part of valve sleeve 6 extends into opening 11 of valve sleeve 6 to increase the stability of the connection. When assembled, base body 42 sits on cover element 33 and the upper end of valve jacket 5, for example.

In addition, two electric contact elements 55 are provided in connecting part 40 and are coated during the plastic injection molding of base body 42 and are then subsequently embedded in the plastic. An electric plug connector 56 which is also produced by injection molding is part of base body 42. At one end, electric contact elements 55 end as exposed contact pins of electric plug connector 56, which can be connected to a corresponding electric connector element (not shown) such as a contact strip for complete electric contacting of the injection valve. On the end opposite plug connector 56, contact elements 55 form an electric connection to the corresponding contact pins 34.

Figure 2:
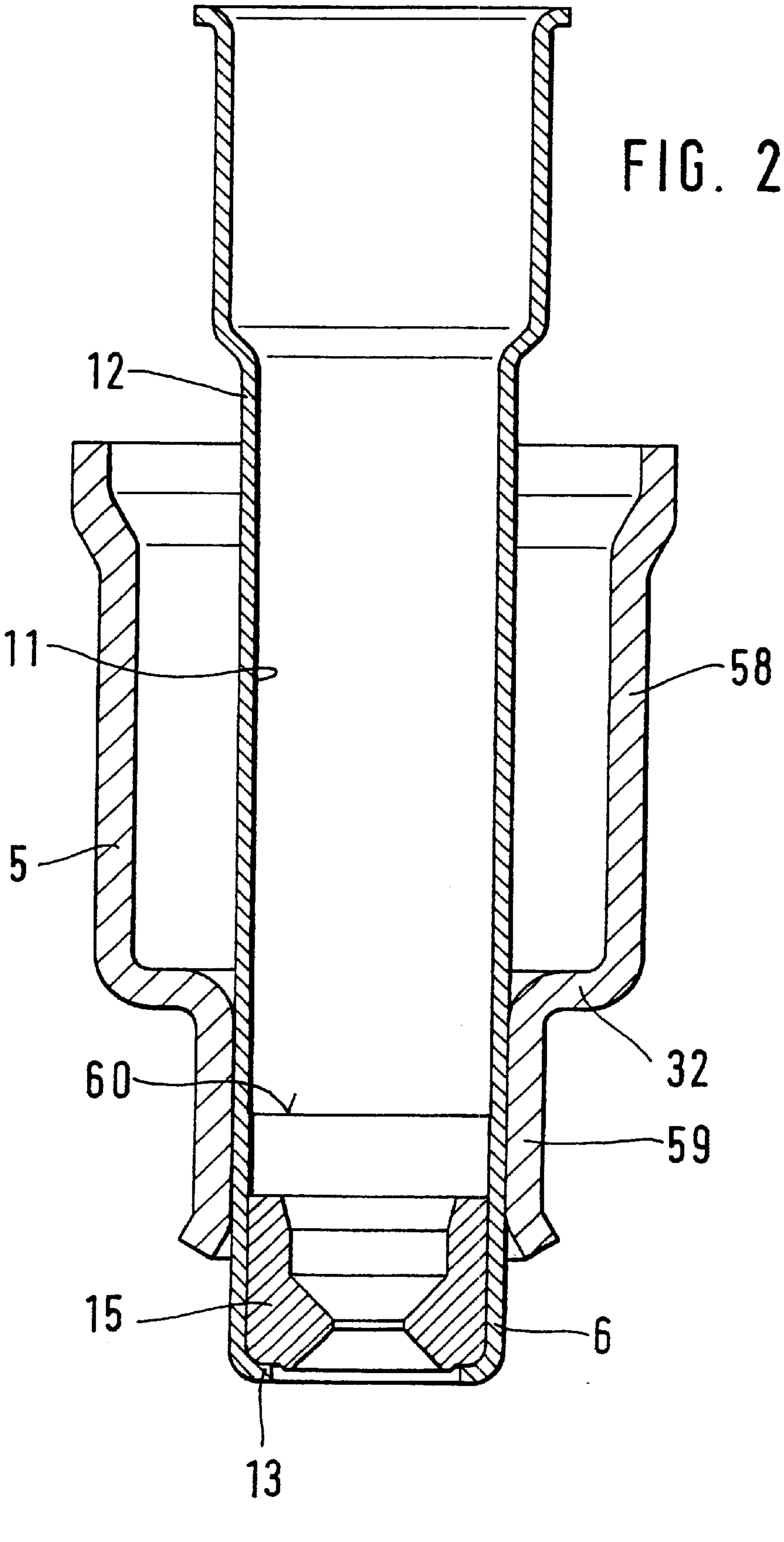
FIG. 2 shows (on a different scale) the valve module installed according to the present invention.

FIG. 2 illustrates a valve module that can be installed according to the present invention, where this valve module is formed by valve jacket 5, valve sleeve 6 and valve seating body 15. As already described in conjunction with FIG. 1, valve seating body 15 and core 2 are arranged in internal opening 11 in valve sleeve 6, while magnet coil 1 and valve jacket 5 are arranged on the outer periphery of valve sleeve 6 as an external magnetic circuit part. Valve jacket 5 is designed with a jacket area 58 surrounding the coil space like a sheath and a mounting area 59 running further toward valve seating body 15.

The two areas 58 and 59 differ in diameter. Jacket area 58 has a much larger diameter than valve sleeve 6 to form the coil space and thus to receive magnet coil 1 including coil body 3, but mounting area 59 is designed with only a slightly larger inside diameter than the outside diameter of valve sleeve 6. Radial area 32 is between jacket area 58 and mounting area 59.

According to the present invention, valve jacket 5 is first pushed onto valve sleeve 6 to assemble the valve module described here. Valve sleeve 6 and valve jacket 5 have dimensions with a tolerance such that one can be pushed on the other loosely without forming burrs. In an automatic tool, valve jacket 5 is held on valve sleeve 6 in the desired position. Then valve seating body 15 is inserted into internal opening 11 in valve sleeve 6 in the downstream direction or is pressed there on the basis of its outside dimensions. Valve seating body 15 is advantageously inserted until it rests against bottom section 13 of valve sleeve 6. However, it is also conceivable to design valve sleeve 6 without bottom section 13 and to arrange valve seating body 15 further upstream in valve sleeve 6.

In the axial extent of mounting area 59 of valve jacket 5, a shoulder 60 which is provided, for example, in internal opening 11 of valve sleeve 6 is formed by a minimal change in inside diameter. When valve seating body 15 is pressed in place, a widening takes place at least in this partial section of valve sleeve 6. Valve seating body 15 assumes an end position within valve sleeve 6 where it remains axially overlapped with mounting area 59 of valve jacket 5. A fixed connection between valve sleeve 6 and valve jacket 5 is achieved by simply pressing valve seating body 15 into position. Due to the axial overlap of valve seating body 15 and mounting area 59 of valve jacket 5, there is a permanent radial pressure and sufficient tension, making it possible to omit any additional joining operation, such as welding or crimping.

What is claimed is:

1. A method of assembling a valve module of a fuel injector for a fuel injection system of an internal combustion engine, the fuel injector including a thin-walled valve sleeve and an electromagnetic actuating element having a magnet coil, an internal pole, an external magnetic circuit part, and a movable valve closing body cooperating with a valve seat assigned to a valve seating body, the valve seating body and the internal pole being arranged in an internal opening in the valve sleeve, and the magnet coil and the magnetic circuit part being arranged on an outer periphery of the valve sleeve, the method comprising the steps of:

pushing the magnetic circuit part onto the valve sleeve;

pressing the valve seating body into the internal opening in the valve sleeve in order to widen the internal opening in at least a partial section of the valve sleeve and thereby create a direct interference fit between the valve sleeve and the magnetic circuit part; and forming a fixed connection between the valve sleeve and the magnetic circuit part by pressing the valve seating body into position.

2. The method according to claim 1, wherein:

the valve sleeve includes a jacket section and a bottom section running substantially perpendicular to the jacket section, the method further comprising the step of:

pushing the valve seating body until the valve seating body contacts the bottom section.

3. The method according to claim 1, wherein:

the magnetic circuit part includes a jacket area extending around the valve sleeve at a definite distance and a mounting area contacting the valve sleeve, the jacket area and the mounting area being joined by a radial area.

4. The method according to claim 3, wherein:

the fixed connection of the valve sleeve and the magnetic circuit part is achieved in a vicinity of the mounting area.

5. The method according to claim 4, further comprising the step of:

providing a shoulder in the internal opening in the valve sleeve in an axial extent of the mounting area.

6. The method according to claim 3, further comprising the step of:

bringing the valve seating body into an end position within the valve sleeve such that the valve seating body remains axially overlapped with the mounting area.

* * * * *